H. Ehrenfeld,
Clutch.

No. 803. Reissued Aug. 30, 1859.

Witnesses.
R. S. Spencer
R. D. Traphagen

Inventor
Henry Ehrenfeld

N. PETERS, PHOTO-LITHOGRAPHER, WASHINGTON, D. C.

UNITED STATES PATENT OFFICE.

HENRY EHRENFELD, OF NEW YORK, N. Y.

IMPROVED DEVICE FOR CONVERTING RECIPROCATING INTO INTERMITTENT ROTARY MOTION.

Specification forming part of Letters Patent No. 24,448, dated June 21, 1859; Reissue No. 803, dated August 30, 1859.

*To all whom it may concern:*

Be it known that I, HENRY EHRENFELD, of the city, county, and State of New York, have invented a new and Improved Device for Converting Reciprocating into Intermittent Rotary Motion; and I do hereby declare that the following is a full, clear, and exact description of the same, reference being had to the accompanying drawings, forming a part of this specification, in which—

Figure 1:
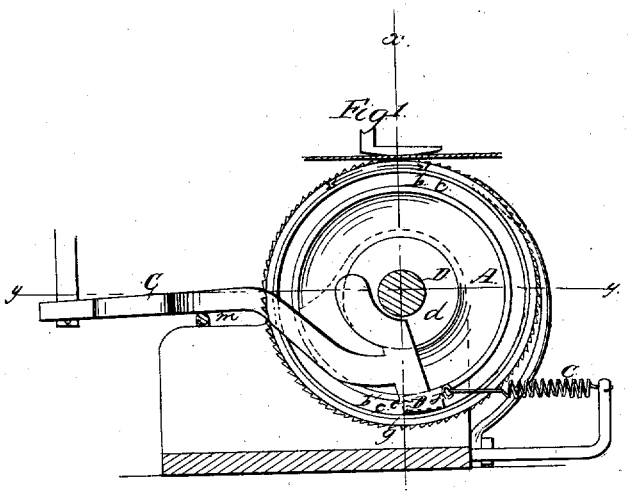
Figure 2:
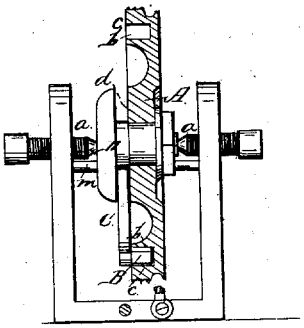
Figure 3:
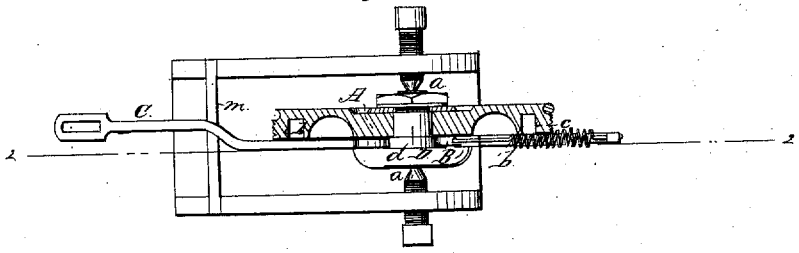

Figure 1 represents a vertical longitudinal section of my device, the line *z z*, Fig. 3, indicating the plane of section. Fig. 2 is a transverse vertical section of the same, taken in the line *x x*, Fig. 1. Fig. 3 is a horizontal section of the same, the line *y y*, Fig. 1, indicating the plane of section.

Similar letters of reference in the three figures indicate corresponding parts.

This invention consists, first, in arranging a lever with a dog in such relation to a grooved wheel that said dog and lever act on the wheel without a spring or other connection to keep the dog in the proper position toward the center or hub of the wheel, and that the lever can be brought in such a position as to impart motion to the wheel in either direction.

My invention consists, secondly, in arranging the hub of the wheel with a groove that serves to keep the dog down in its place and to prevent the lever tipping over sidewise; and my invention consists, thirdly, in arranging the lever with the dog permanently attached to it in such a manner that said lever, when it is in its place, makes an angle of ninety degrees, or nearly so, with a line drawn from the center of the wheel through the dog.

To enable those skilled in the art to make and use my invention, I will proceed to describe its construction and operation.

A represents a wheel, to which an intermittent rotary motion is to be imparted. It is fitted between two points, *a a;* but it may also be arranged on a revolving shaft, and it has a concentric groove, *b c*, turned in one side.

B is a dog, which is rigidly attached to a lever, C, and in such a position that it stands at right angles, or nearly so, with the direction of the lever. This dog fits loosely into the groove *b c*, and the lever is guided and the dog is kept in said groove by means of a groove, *d*, turned in the hub D of the wheel; but it (the lever and dog) is not connected in any way to the center or hub of the wheel, so that the dog has to sustain the weight of both itself and the lever. The front end of said lever is attached to a rod which receives a reciprocating motion from some source, so that a vibrating motion is imparted to the lever, which, in its turn, is converted in the required intermittent rotary motion. The dog B is arranged in the groove *b c* in such a manner that the inner edge, *e*, of the dog touches the inner wall, *b*, of the groove, and it will be noticed that when the line *e f*, constituting one of the edges of the dog, should be prolonged beyond the point *e* the flat surface of the dog would bear against the inner wall of the groove, and in this case, when the front end of the lever is raised, the dog will slip in the groove, and no motion is imparted to the wheel. If, however, the edge *e* is in contact with the inner wall, *b*, of the groove, as represented in Fig. 1, and if the front end of the lever is raised, the dog is turned in the groove *b c*, so that it binds in the same, and that the wheel is caused to rotate in the direction of arrow 1.

In order to keep the lever and the dog in this position, a rod, *m*, is placed under the front end of the lever to prevent its sinking down too low, and the dog is drawn back in the groove by a spring, C′, which also serves to bring the lever back to its original position whenever its front end has been raised. The spring is, however, not at all essential to my device, and the dog will act on the wheel if the spring is unhooked. In this case it is only necessary to operate the lever without imparting to the same a longitudinal motion in the direction from the center of the wheel; and in the same manner, if the spring is unhooked, and if the lever is moved in a longitudinal direction until the lower edge, *g*, of the dog comes in contact with the outer wall, *c*, of the groove *b c*, and if the front end of the lever is now depressed, the wheel will be caused to rotate in the direction of arrow 2, whereas the front end of the lever may now be raised without affecting the wheel. In this case it is still more apparent how my lever and dog act without being connected to the center or hub of the wheel, the groove *d* in the hub serving only to keep the dog B in the groove *b c*, and to prevent the lever tipping over sidewise. This effect is gained by the particular bend given to the lever, so as to bring the dog in such relation to the front end of the lever that a line drawn from the center of the wheel through the dog makes an angle of ninety degrees, or nearly so, with the direction of the lever. This arrangement is particularly adapted as feed for sewing-machines, as it is very simple and perfectly sure in its operation. It may, however, be applied with equal advantage to all sorts of feed-wheels or feed-rollers where an alternate circular motion is required.

Having thus fully described my invention, what I claim as new, and desire to secure by Letters Patent, is—

1. Arranging the lever C and dog B, in combination with the grooved wheel A, or its equivalent, in such a manner that said lever and dog act on the wheel without a connection to the center or hub of the wheel, substantially as and for the purpose specified.

2. In combination with the lever C, dog B, and wheel A, the arrangement of the groove *d*, or its equivalent, in the hub of the wheel, substantially as and for the purpose specified.

3. I do not claim the arrangement of the lever and dog in the relative position to each other which has been described, except when the two are made of one piece, or if the dog is permanently attached to the lever, but I claim arranging the lever C, with the dog B permanently attached to it, in such a manner that the direction of said lever, when it is in its place, makes an angle of ninety degrees, or nearly so, with a line drawn from the center of the wheel through the dog, substantially as herein specified.

H. EHRENFELD.

Witnesses:
J. O. HARGER,
W. HAUFF.